United States Patent [19]

Lynch

[11] Patent Number: 4,672,889
[45] Date of Patent: Jun. 16, 1987

[54] BUILDING STRUCTURES

[76] Inventor: Gary M. Lynch, M.S. 1020, Fernvale, Queensland, Australia, 4305

[21] Appl. No.: 747,974

[22] Filed: Jun. 24, 1985

[51] Int. Cl.[4] .................................................. F24F 7/02
[52] U.S. Cl. ........................................ 98/42.2; 47/17; 52/66; 52/72
[58] Field of Search .................... 47/17; 52/66, 69, 72; 98/42.14, 42.16, 42.19, 42.2

[56] References Cited

U.S. PATENT DOCUMENTS

| 87,668 | 3/1869 | Hayes | 52/72 |
|---|---|---|---|
| 792,902 | 6/1905 | Kelly | 52/69 |
| 956,428 | 4/1910 | Rueben | 52/69 |
| 3,028,872 | 4/1962 | Cresswell | 98/42.16 X |
| 4,012,867 | 3/1977 | Lainchbury et al. | 47/17 |

FOREIGN PATENT DOCUMENTS

| 2445838 | 4/1976 | Fed. Rep. of Germany | 52/66 |
|---|---|---|---|
| 2659748 | 7/1978 | Fed. Rep. of Germany | 98/42.2 |
| 184807 | 6/1936 | Switzerland | 52/72 |
| 393429 | 12/1973 | U.S.S.R. | 52/72 |

Primary Examiner—Harold Joyce
Attorney, Agent, or Firm—Murray Schaffer

[57] ABSTRACT

A ventilation assembly for buildings of the type having a roof frame comprising a plurality of arcuate roof members extending outwardly from a central gutter section and supporting a flexible roof covering, the ventilation assembly including a pair of vent arms which normally rest upon the gutter section and to which the roof covering is secured on either side of the gutter section but which may be raised above the gutter section to lift the roof covering and form a ventilation opening for hot air from the building.

7 Claims, 5 Drawing Figures

BUILDING STRUCTURES

This invention relates to improvements to building structures and in particular an improved ventilation assembly for building structures, primarily building structures for use in agricultural applications for example plant nursery buildings which have a flexible roof covering.

It is common to construct agricultural buildings such as plant nursery buildings, with ventilation systems for permitting the escape of hot air from the building, however, the arrangements presently in use are not particularly efficient. For example in one known arrangement, ventilation flaps are provided in the upper portion of the building, each flap being pivotally mounted along one edge to the central roof beam of the building. For ventilation purposes, the flap opposite the prevailing wind is opened so that a venturi effect will be created to remove hot air from the building. The main disadvantage of this arrangement is that building ventilation depends on the direction of the prevailing wind.

The present invention aims to overcome or at least alleviate some of the above disadvantages by providing an improved ventilation assembly which will function in a reliable and efficient manner to vent hot air from building structures having a flexible roof covering such as plant nursery buildings or the like.

With the above and other objects in view, this invention resides broadly in a ventilation assembly for a building structure of the type having a roof including a roof covering formed of flexible sheet material, said ventilation assembly including first and second frame parts disposed centrally in an upper portion of said roof and extending longitudinally of said building structure, said roof covering including first and second portions secured to the respective said first and second frame parts and extending away therefrom on opposite sides of said ventilation assembly, means associated with said frame parts and operable to move said frame parts between a first attitude wherein said roof is substantially closed to inhibit ventilation from said building structure and a second attitude wherein said frame parts are moved away from each other to define an opening in said roof to ventilate said building structure.

In order that the invention may be more readily understood and put into practical effect, reference will now be made to the accompanying drawings which illustrate a preferred embodiment of the invention and wherein.

Figure 1:
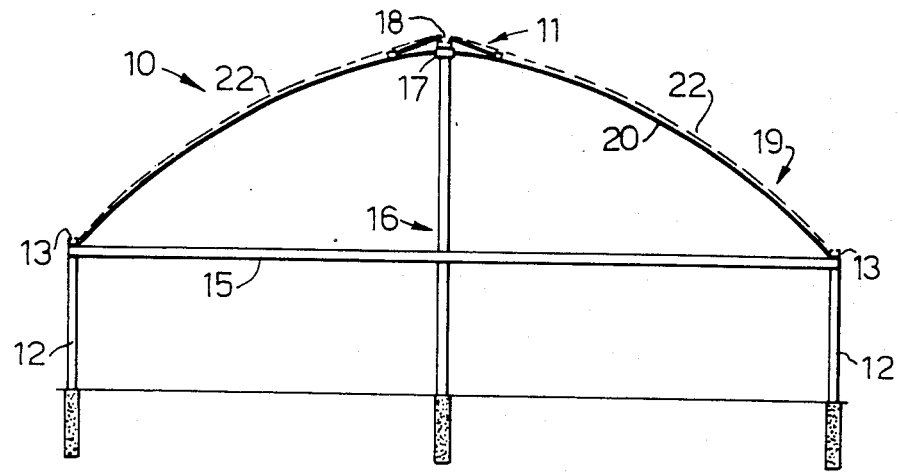
FIG. 1 is a sectional view of a building structure incorporating a ventilation assembly in accordance with the present invention.
Figure 2:
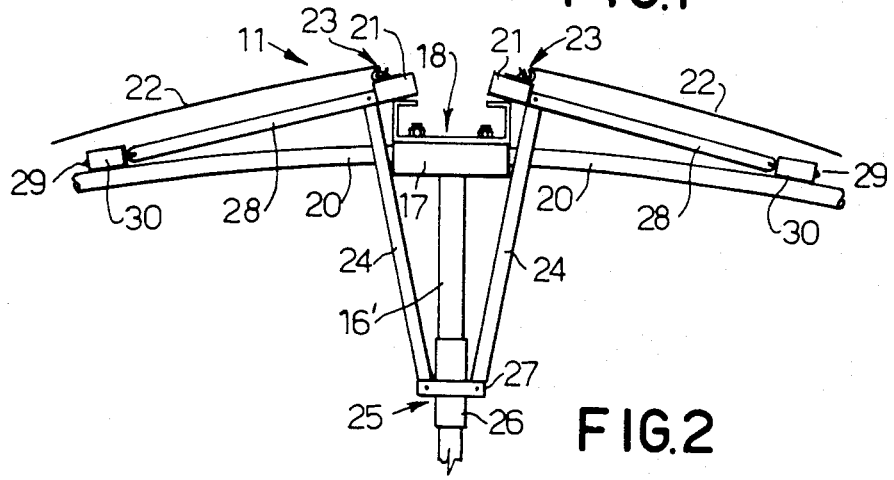
FIG. 2 is an enlarged view of the ventilation assembly for the building structure shown in FIG. 1 in a closed attitude.
Figure 3:
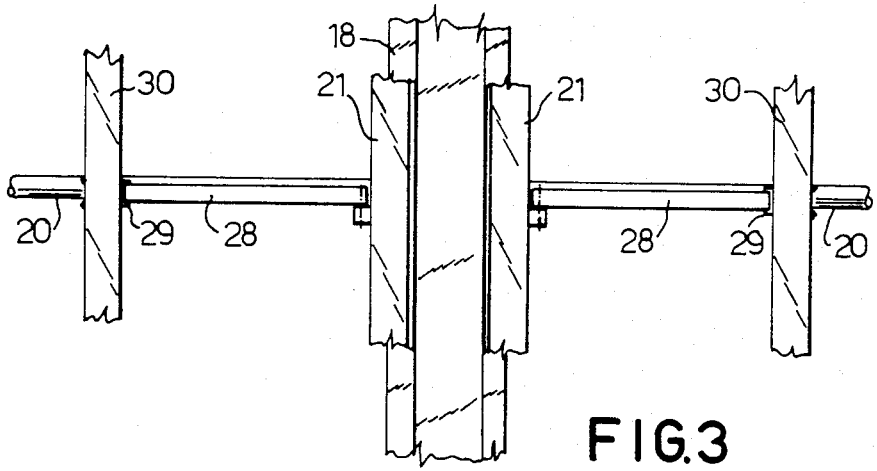
FIG. 3 is a plan view showing details of the components of the ventilation assembly frame.
Figure 4:
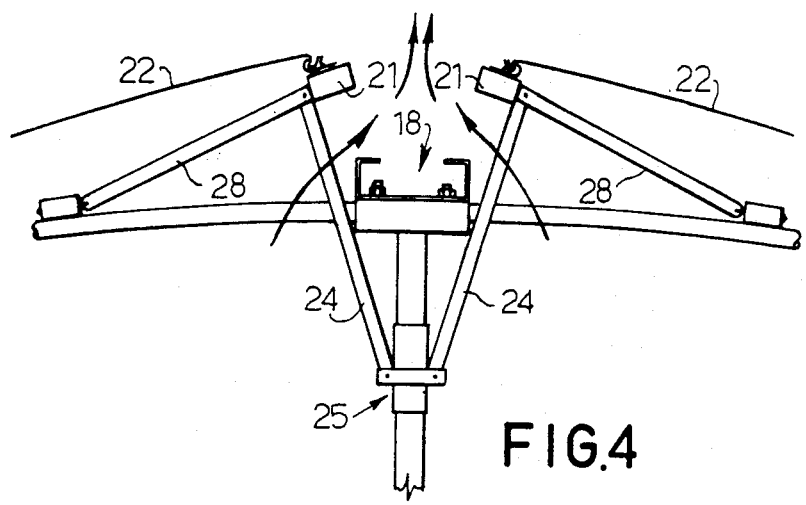
FIG. 4 is a view of the ventilation assembly in an open attitude.

Referring to the drawings, there is illustrated a building structure 10 incorporating a ventilation assembly 11 according to the present invention. As shown in FIG. 1, the building structure 10 includes an external frame comprising a plurality of upstanding side members 12 preferably of channel sectioned form which support respective longitudinally extending gutter sections 13 which are fixed to the upstanding side members 12 by respective angle brackets. In this arrangement, the gutter section 13 both provide a drainage path for rainwater falling onto the roof of the building as well as comprising a structural member of the building. The building structure 10 in this embodiment also includes a plurality of spaced transversely extending members 15 which extend between opposite upstanding side members 12 of the structure and respective spaced upstanding central supports 16 which in this embodiment support at their upper end via an intermediate member 17, a longitudinally extending gutter section 18 which is secured to the intermediate member 17 preferably by bolting.

In this embodiment, the roof assembly 19 of the building structure 10 comprises a plurality of arcuate ribs 20 preferably formed of galvanised tubing which extend between the respective gutter sections 13 at the side of the building 10 and the ventilation assembly 11 preferably being connected to opposite sides of the intermediate member 17.

The ventilation assembly 11 includes a pair of longitudinally extending vent arms 21 which in the closed position of the ventilation assembly 11, rest upon the opposite side flanges of the gutter section 18. A flexible roof covering of sheet plastics or like waterproof material is supported over the ribs 20 and includes two portions 22 each being secured at their inner edges to the arms 21 and at their opposite outer edges to the side gutter sections 13. Preferably the flexible roof covering portions 22 are secured to the arms 21 and gutter sections 13 by "zip locks" 23 or other conventional connection arrangement. The longitudinally extending vent arms 21 are fixedly secured preferably by bolting to downwardly extending control arms 24 which are pivotally secured to slide assemblies 25 which are arranged for slidable movement along the upper portions 16' of the supports 16. For this purpose, the slide assemblies 25 include sleeves 26 which are located telescopically about the portions 16' and which are provided with transversely extending support bracket portions 27 which pivotally support the lower ends of the control arms 24. Respective pivot arms 28 are pivotally connected at one end to the control arms 24 adjacent their bolted connection to the vent arms 21 and at their other end via U-bolts 29 to longitudinally extending members 30 secured to the arcuate members 15 on opposite sides of the central gutter section 18.

It will be seen that when the slide assemblies 25 are raised, both vent arms 21 will be lifted from the central gutter section 18 so that vent arms 21 and thus the roof covering sheets 22 are raised on either side of the gutter section 18 to permit hot air to be vented from the building structure 10. The slide assemblies 25 may be raised by hand, say with the assistance of an extension arm, however, preferably the slide assemblies 25 on respective portions 16' are linked by a pulley and cable system which is connected to a manually operable winch located in a convenient lower position to be accessible to a user so that operation of the winch will cause corresponding movement of the slide assemblies 25 and opening of the ventilation assembly 11 the full length of the building.

The roof covering material 22 may also be secured to the members 30 so that the members 30 and vent arms 21 together with the roof material 22 spanning the space between the arms 21 and members 30 effectively define vent flaps.

Figure 5:
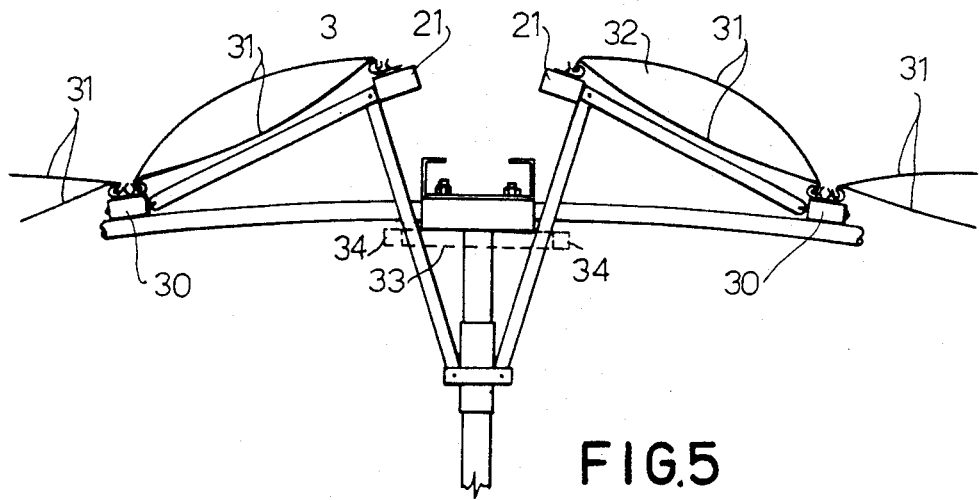
FIG. 5 illustrates the ventilation assembly of the present invention as applied to buildings having a roof covering formed of two layers of sheet material.

In a further alternative arrangement shown in FIG. 5, the roof covering comprises twin layers of flexible material 31 such as sheet plastics material which are secured to the side gutter sections 13 and also to the members 21 and 30 and at their side edges to define a sealed space 32 which may be inflated by means of fans or the like to define insulating air pockets to stabilise the temperature within the building.

In smaller building structures, the members 30 may be eliminated and pivotal arms 28 provided only at opposite ends of the building structure and pivotally mounted to the opposite end arcuate roof members 20. In this arrangement, opening and closing of the roof is achieved in a similar manner to that described above. In yet a further arrangement, the arcuate roof members 20 may be secured to the vent arms 21 so as to be raised by the slide assemblies 25 to define the ventilation opening for the building.

It will be seen that the ventilation arrangements described above are not dependent on the direction of the ambient wind to achieve a venting action from the building. Furthermore, as the roof covering material is raised equally on either side of the ventilation opening, a laminar air flow will be maintained across the ventilation opening at all times so that a venturi effect will be established ensuring maximum withdrawal of hot air from the buildings.

In a further arrangement, the pivotal arms 28 may be eliminated and outward movement of the control arms 24 limited by brackets 33 (shown in dotted outline in FIG. 5) which are secured to the upright portions 16'. Preferably the brackets 33 are of a generally C or U shaped configuration and fixed to the portions 16' so that the opposite legs 34 of the "C" or "U" will extend transversely thereof and be positioned on the side of each control arm 24 opposite the gutter section 18. Alternatively, the arms 24 may be biased towards each other by means of springs which limit outward movement thereof and maintain tension in the roofing material 22. Either of these latter two arrangements may be used in conjunction with the pivotal arm arrangement described and shown in FIGS. 2 to 5. Where central supports 16 are not provided, say between the ends of a building, separate portions 16' may be simply supported on respective transverse members 15 to project upwardly therefrom and carry respective slides 25.

It will be realised that many modifications may be made to the above described invention without departing from the spirit and scope thereof. The vent assembly 11 is particularly suitable to buildings having a roof covering formed of plastics material, however, it may be also applied to buildings with other forms of flexible roof covering. The gutter sections 13 and 18 if required, may be replaced by simple walkways whilst the intermediate member 17 may be eliminated and the arcuate members 20 simply secured to the underside of the gutter section 18.

What is claimed is:

1. A ventilated roof assembly comprising a roof having a central longitudinal gutter support section and a plurality of transversely extending spaced support members, first and second longitudinally extending frame parts disposed over said support members on the respective sides of said gutter support section, said frame parts being pivotally secured along one longitudinal edge to said support members and extending centrally of said roof to have its opposite longitudinal edge in abutment with said central gutter section when resting on said support members, a roof covering of flexible sheet material including first and second portions secured to the respective first and second pivotal frame parts and extending away therefrom over the remainder of said roof and being fixedly secured to the support members and means pivotally interconnecting said covered frames so that said covered frame parts are movable in concert between a first attitude in abutment with said gutter section wherein said roof is substantially closed to inhibit ventilation from said building structure and a second attitude wherein said frame parts are moved away from said gutter section to define an opening in said roof to ventilate said building structure.

2. The assembly according to claim 1, wherein said first and second frame parts are supported for pivotal movement about respective longitudinally extending pivot axes disposed on opposite sides of said central member.

3. The assembly according to claim 2 and including at least one pair of pivot arms pivotally supported at one end of movement about the respective said pivot axes and pivotally connected at their other end to the respective first and second said frame parts.

4. The assembly according to claim 3 and including a pair of longitudinally extending roof members supported on opposite sides of said central member, each said roof member supporting respective said pivot arms for movement about said pivotal axes.

5. The assembly according to claim 1, wherein said operable means includes at least one pair of control arms secured at one end to the respective said frame parts and at their other end to actuating means whereby said frame parts may be moved simultaneously by said actuating means between said first and second attitude.

6. The assembly according to claim 5, wherein each said roof covering portion includes first and second layers of sheet material defining therebetween air pockets in said roof.

7. The assembly according to claim 5, wherein said central member is supported by at least one upstanding support member and wherein said actuating means includes a sleeve member arranged for slidable movement along said support member.

* * * * *